United States Patent
Carlgren

(10) Patent No.: US 6,273,389 B1
(45) Date of Patent: Aug. 14, 2001

(54) SELF-LEVELLING APPARATUS FOR A SEAT

(75) Inventor: Klas Carlgren, Sigtuna (SE)

(73) Assignee: Carlgrens Ergonomi AB (SE)

( * ) Notice: Subject to any disclaimer, the term of this patent is extended or adjusted under 35 U.S.C. 154(b) by 0 days.

(21) Appl. No.: 09/284,585

(22) PCT Filed: Oct. 3, 1997

(86) PCT No.: PCT/SE97/01661

§ 371 Date: Apr. 15, 1999

§ 102(e) Date: Apr. 15, 1999

(87) PCT Pub. No.: WO98/16405

PCT Pub. Date: Apr. 23, 1998

(30) Foreign Application Priority Data

Oct. 16, 1996 (SE) .................................................. 9603786

(51) Int. Cl.[7] .................................................. A47G 29/00
(52) U.S. Cl. ...................... 248/371; 248/272.1; 248/396; 297/329; 180/41
(58) Field of Search .............................. 248/371, 372.1, 248/393, 344, 395, 396; 297/325, 329; 180/41

(56) References Cited

U.S. PATENT DOCUMENTS

| | | | |
|---|---|---|---|
| 3,466,089 | 9/1969 | Stueckle | 297/314 |
| 3,632,076 | 1/1972 | Rogers, Jr. | 248/371 |
| 4,515,337 | 5/1985 | Torras | 248/371 |
| 4,948,081 | * 8/1990 | Hatta | 248/396 |
| 5,054,739 | * 10/1991 | Wallin | 248/550 |
| 5,372,347 | * 12/1994 | Minnich | 248/371 |
| 5,374,022 | * 12/1994 | Gilmer et al. | 248/396 |
| 5,613,662 | * 3/1997 | Blackmore | 248/371 |
| 5,857,535 | * 1/1999 | Brooks | 180/41 |
| 6,026,920 | * 2/2000 | Obeda et al. | 180/41 |
| 6,116,560 | * 9/2000 | Kim | 248/371 |

FOREIGN PATENT DOCUMENTS

| | | |
|---|---|---|
| 8806984 | 9/1988 | (WO) . |
| 94/07707 | 4/1994 | (WO) . |

* cited by examiner

Primary Examiner—Leslie A. Braun
Assistant Examiner—Walter Landry
(74) Attorney, Agent, or Firm—Ostrolenk, Faber, Gerb & Soffen, LLP

(57) ABSTRACT

A self-levelling apparatus for a seat comprises a base (21, 22, 27), a seat levelling assembly (2, 18, 19, 41) displaceably connected with the base, and a reversible electrical motor (40) disposed between the seat and the base for rotation of the seat levelling assembly around an axis about parallel with the base. The seat levelling assembly is disposed between the base and the axis. The motor shaft (42) extends parallel with the axis and engages with a flexible actuation means, such as a roller chain, fixed at its one end at the base. The apparatus also comprises a positional detection means for control of the motor. The apparatus further comprises arcuate co-operating seat and base bearing elements (2; 22) of which at least one has a surface defined by rotation of a straight, curved or irregular line around the axis, such as a cylinder or cone segment surface.

13 Claims, 7 Drawing Sheets

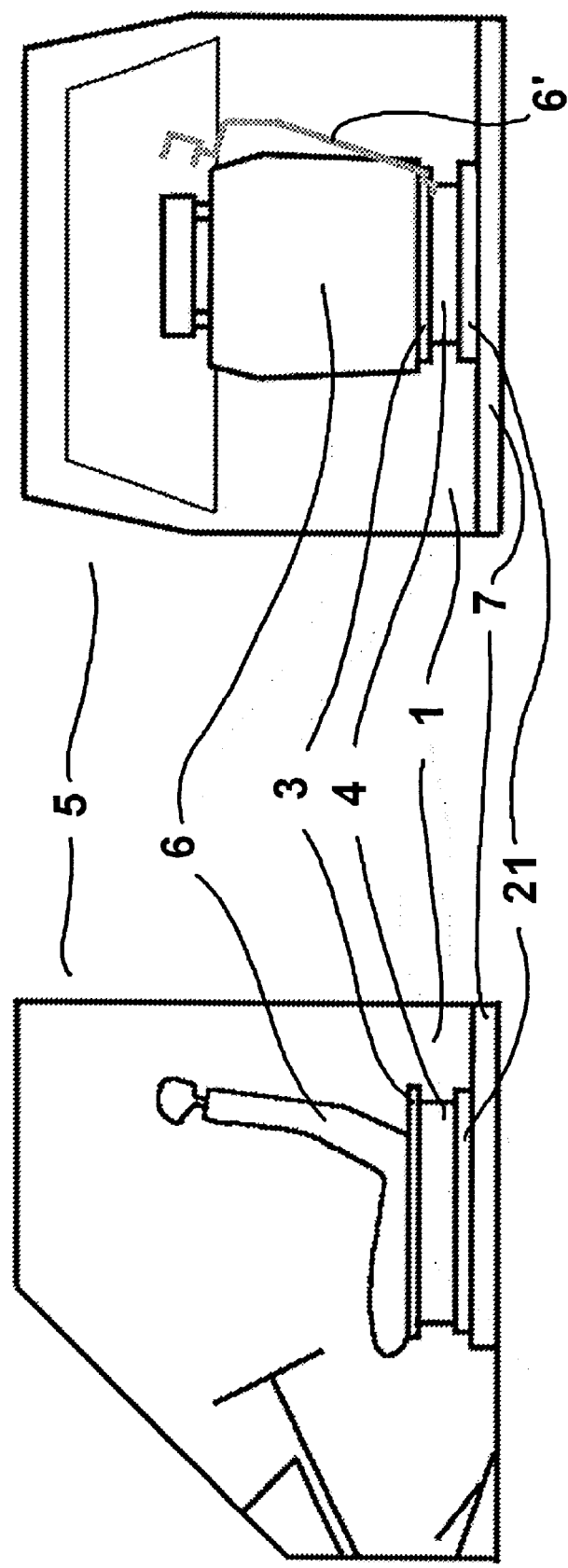

SELF-LEVELLING APPARATUS FOR A SEAT

FIELD OF THE INVENTION

Figure 3:
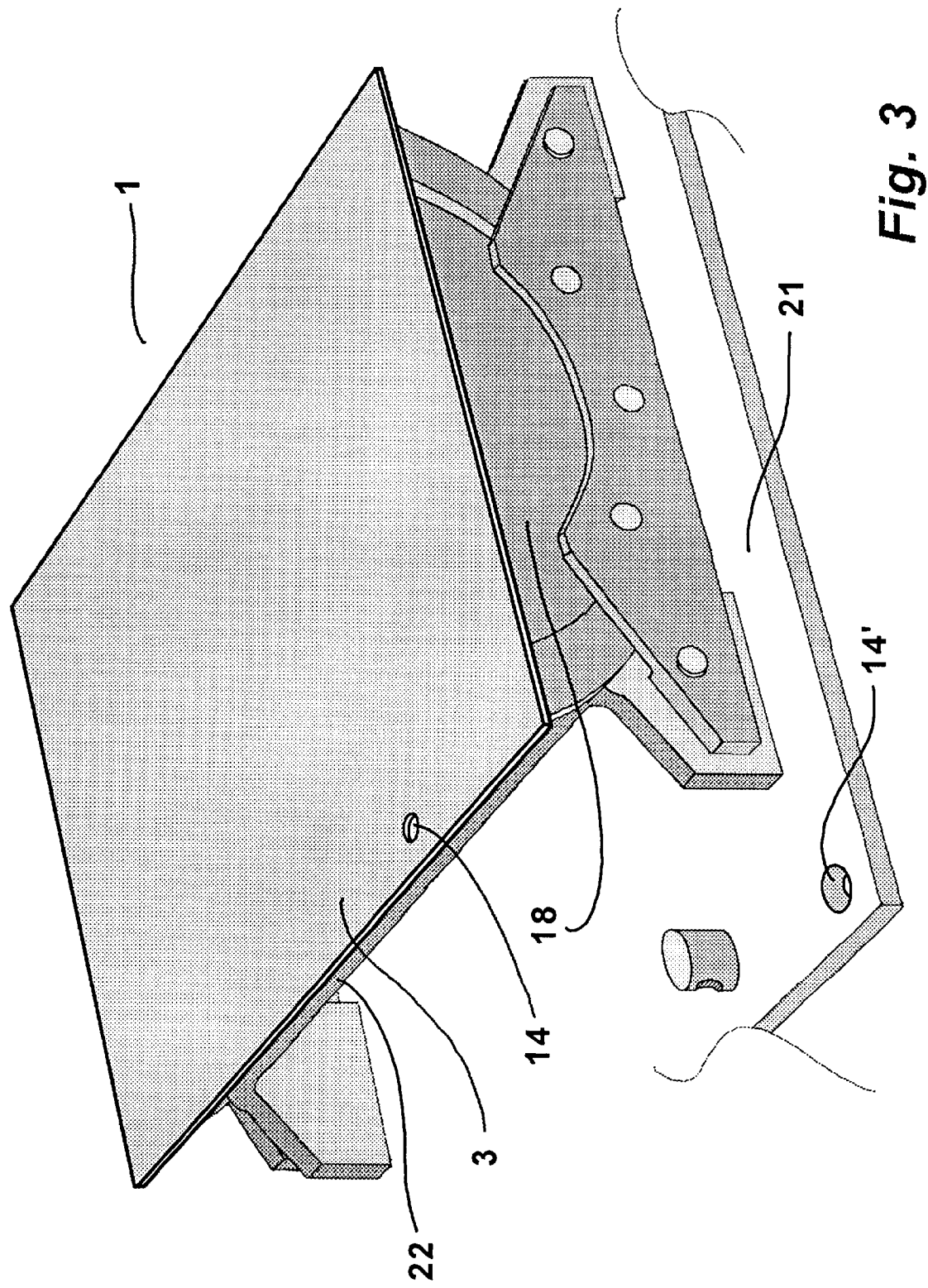

The present invention relates to a motor driven self-levelling apparatus for a seat, in particular a seat of a motor vehicle.

BACKGROUND OF THE INVENTION

In off-highway motor vehicles, such as agricultural tractors, vehicles for timber cutting, disbranching and transport in the terrain, etc., it is desirable to provide an operator seat which automatically adjusts horizontally on lateral tilting of the vehicle. Such a seat improves the comfort of the operator and protects from fatigue and back pain. Forward/backward tilting is a minor problem compared with lateral tilting. It is understood that the afore-mentioned vehicles are designed for slow movement, and that, consequently, seat adjustment need only to be relatively slow.

Self-levelling apparatus of the aforementioned kind are intended for mounting under the operator seat. In most vehicles the operator seat is in a cabin the dimensions of which are determined by the manufacturer of the vehicle independently of its provision with a self-levelling apparatus. For this and other reasons there are important restrictions in the space, in particular in respect of mounting height, available for mounting the self-levelling apparatus. This restriction also affects the choice and arrangement of the heavy duty drive mechanism for compensation of inclination.

OBJECTS OF THE INVENTION

It is an object of the invention to provide a motor driven self-levelling apparatus for a seat, which apparatus has low overall height and is suited for mounting in a spatially restricted environment.

It is another object of the invention to protect the rotating parts of the motor of a self levelling apparatus of the aforementioned kind from dirt and mechanical interference.

It is a further object of the invention to provide for simple manual levelling of the seat in case of motor or power failure.

SUMMARY OF THE INVENTION

The self-levelling apparatus according to the invention comprises a base, a seat levelling assembly displaceably connected with the base, a drive means disposed between the seat and the base for rotation of the seat levelling assembly around an axis about parallel with the base, the seat levelling assembly being disposed between the base and said axis, the drive means comprising a reversible electrical motor fixed to the seat levelling assembly in a way as to have its shaft extending parallel with said axis, said shaft being in direct or indirect engagement with a flexible actuation means fixed at its one end at the base, and further comprising a detection means for detection of the position of the seat levelling assembly in respect to the horizontal plane, the detection means being coupled to control means for control of the motor. The provision of a flexible actuation means which may comprise one or several flexible actuation elements is advantageous by, inter alia, restricting loads to tensile loads. The axis extends above the seat levelling assembly in, depending on the mounting of the apparatus in a motorised vehicle, a longitudinal or transverse direction of the vehicle and substantially in parallel with the ground on which the vehicle stands or runs.

Most commonly the apparatus according to the invention will be disposed under the seat for compensation of lateral tilting. Compensation of forward/backward tilting is of course also possible. The apparatus can be integrated with the seat and/or the vehicle body.

It is preferred for the displaceable connection of the seat levelling assembly with the base to comprise co-operating arcuate seat and base bearing elements pertaining to the seat levelling assembly and the base, respectively, of which at least one comprises a surface defined by rotation of a straight or curved or irregular line, around said first axis, in particular a cylinder segment or cone segment shaped surface. This preferably convex cylinder or cone segment shaped surface or other rotationally defined surface of an arcuate seat levelling element can co-operate with a base bearing element comprising glide, rolling or ball means arranged across a correspondingly, shaped surface, preferably a concave cylinder segment or cone segment shaped surface, and vice versa. Particularly preferred is the arcuate base bearing element to be interrupted at the level of the base plate thus forming two arcuate base bearing element portions defined by the same cylinder or cone axis and radius.

According to another aspect of the invention, it is preferred for the flexible actuation means be segmented and to preferably include a flexible segmented actuation element. Such segmented actuation elements include synchronous (toothed) belts and roller chains. They may co-operate with the motor shaft via a tooth gear or pulley fixed to the shaft. It is furthermore preferred for the segmented actuation means to comprise several segmented actuation elements. It is also preferred for the flexible actuation means to have an unloaded end fixed at the arcuate seat bearing element or an element in rigid geometric relationship with the latter, preferably by interposition of tensioning means, such as a chain adjuster.

Figure 4:
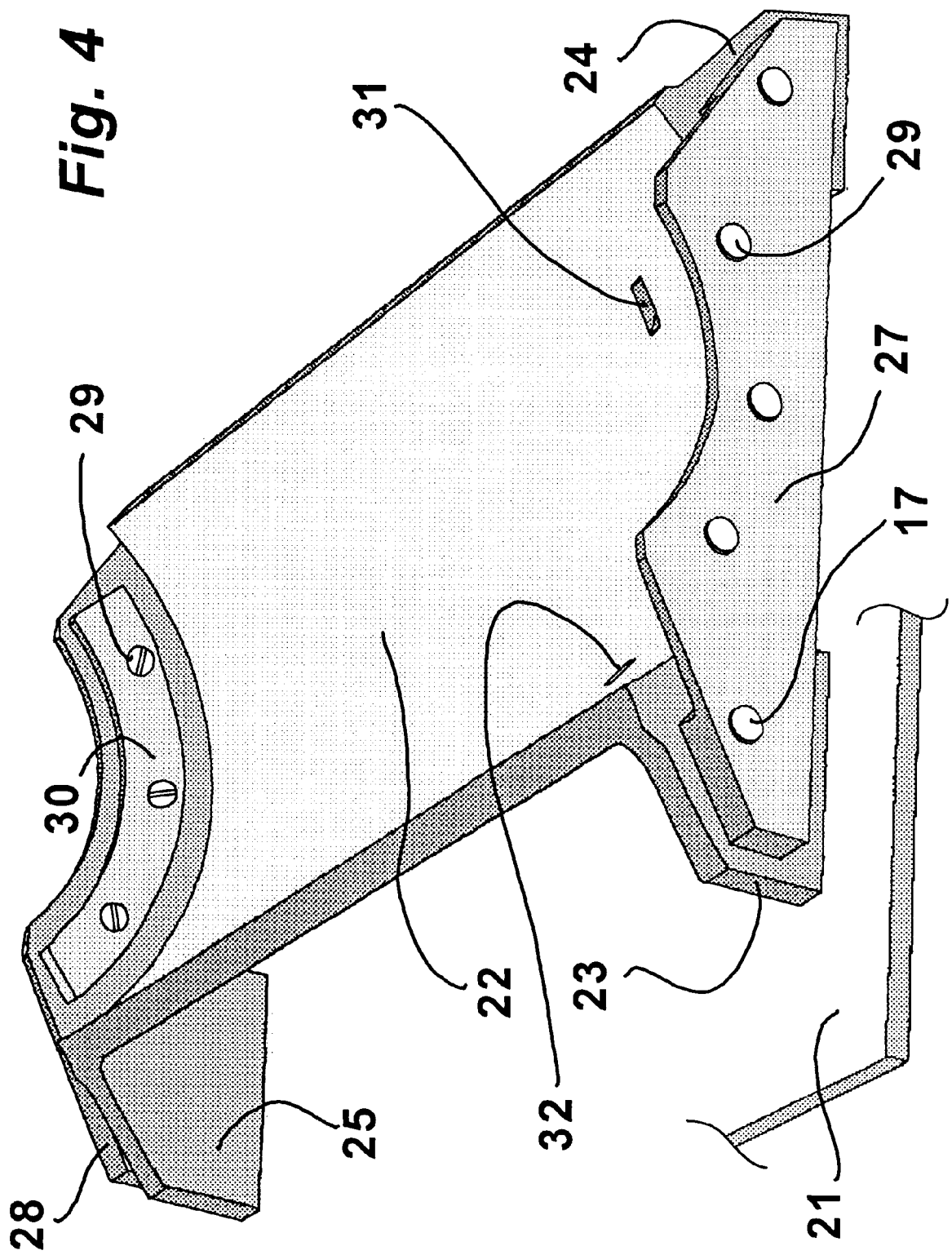
Figure 5:
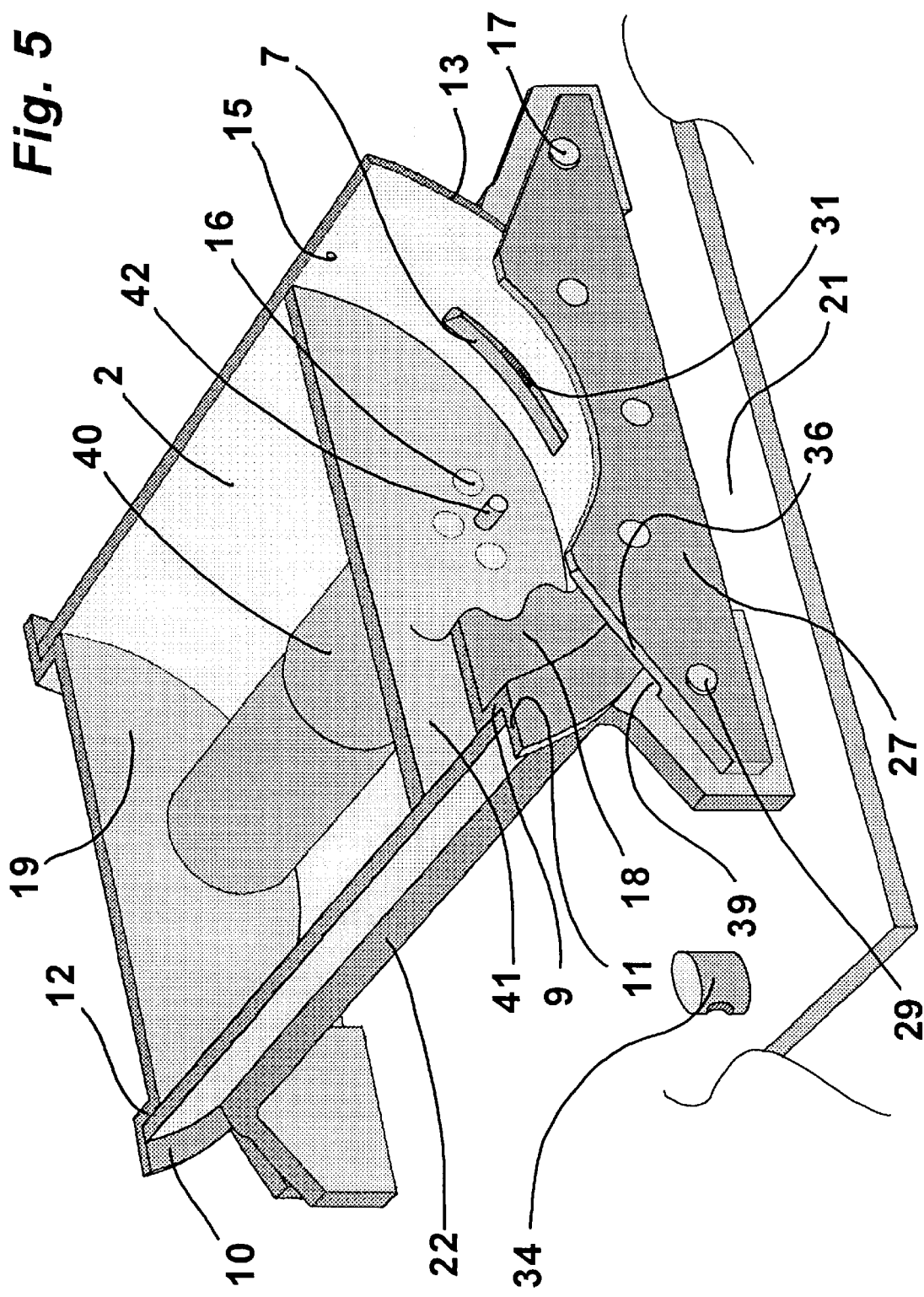
Figure 6:
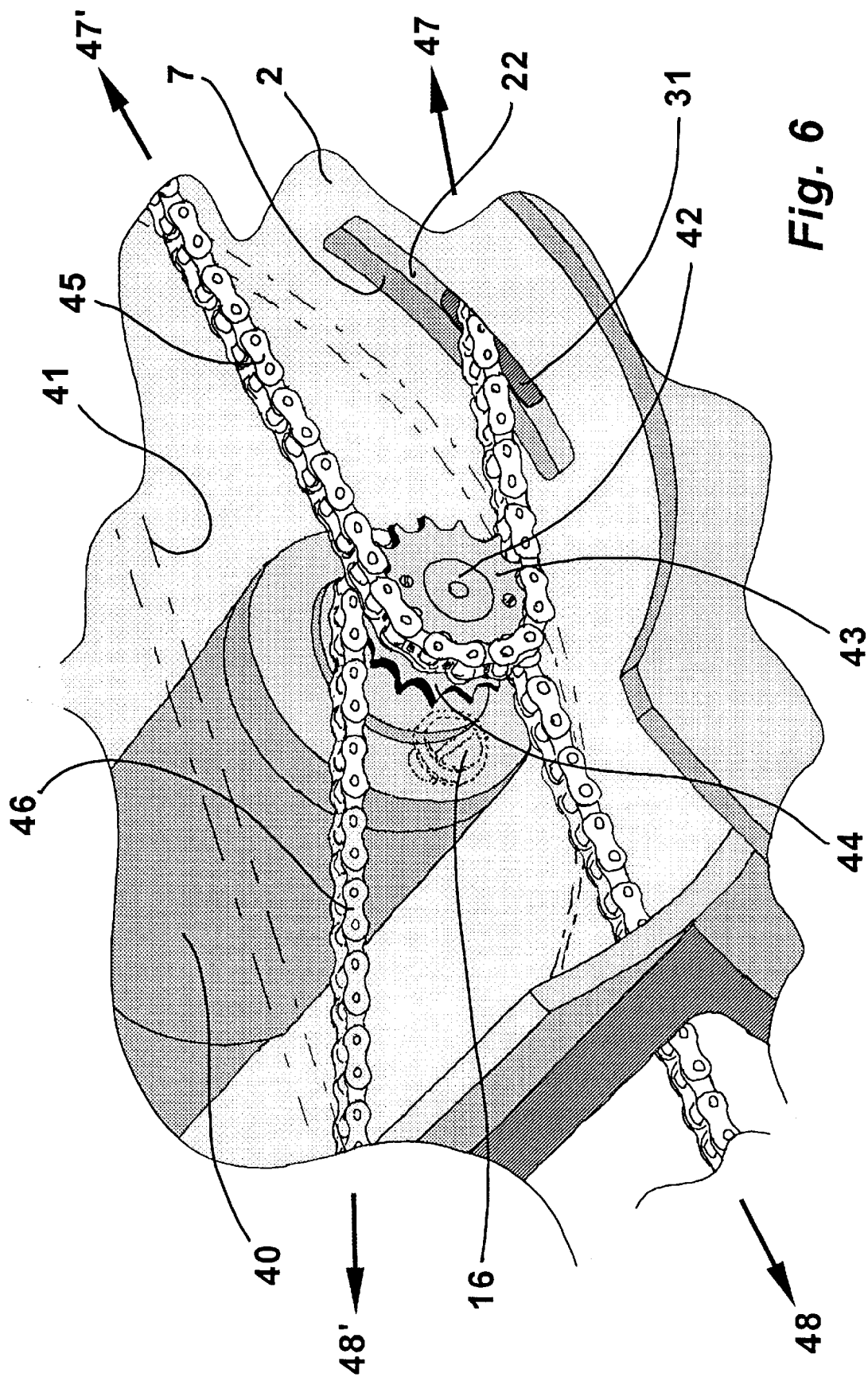
Figure 7:
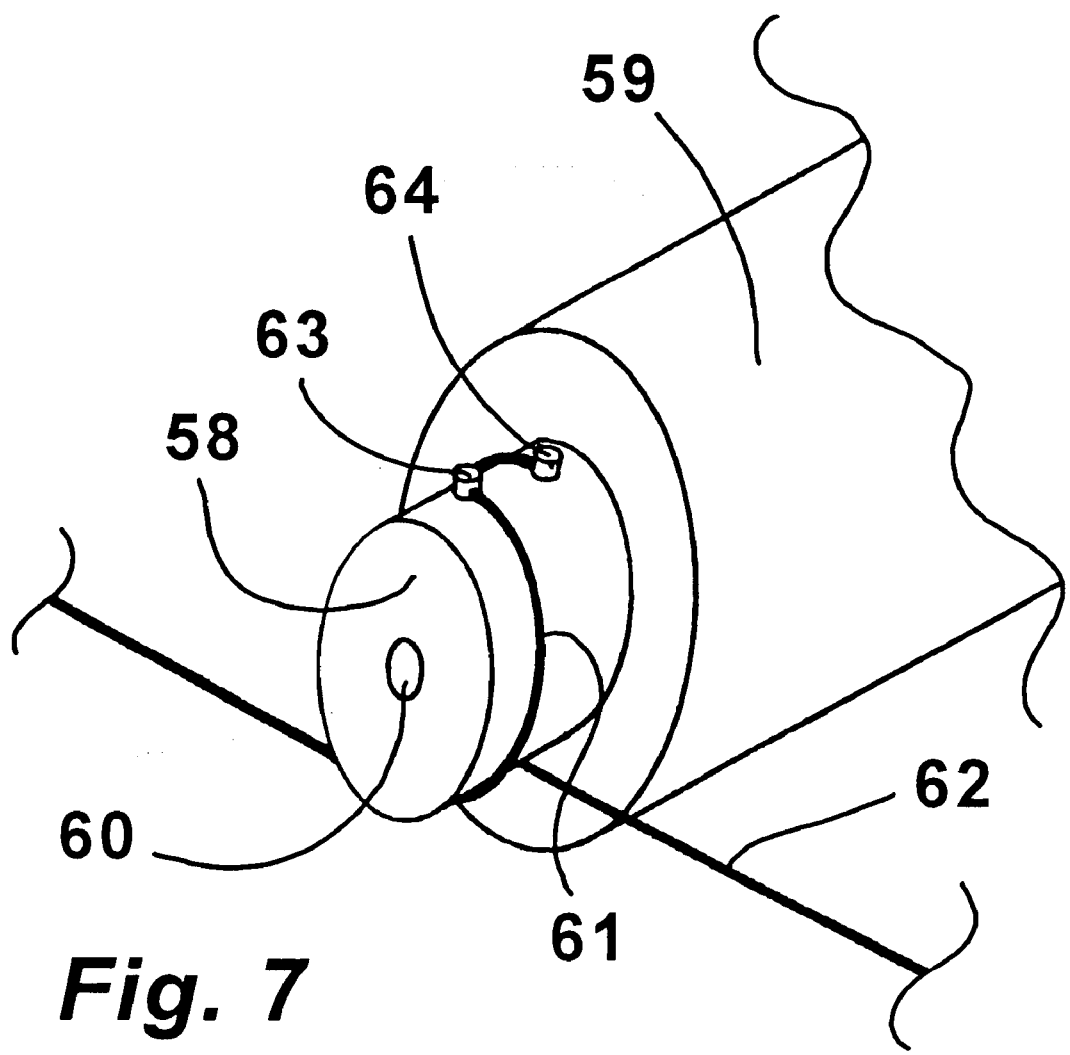
Figure 8:
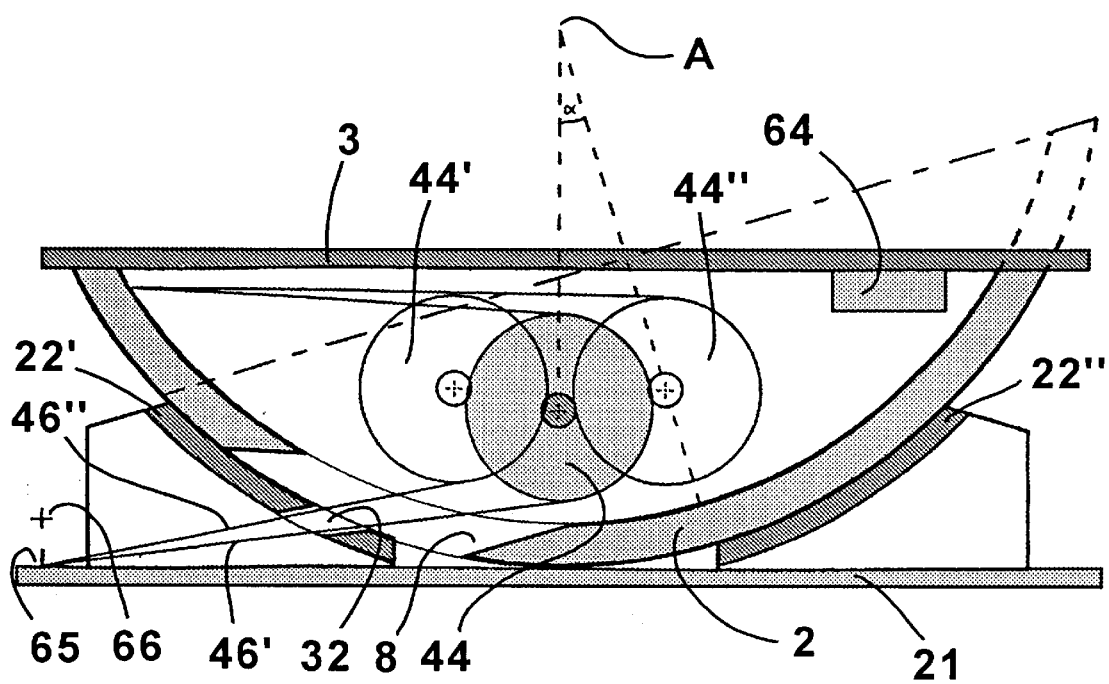
Figure 9:
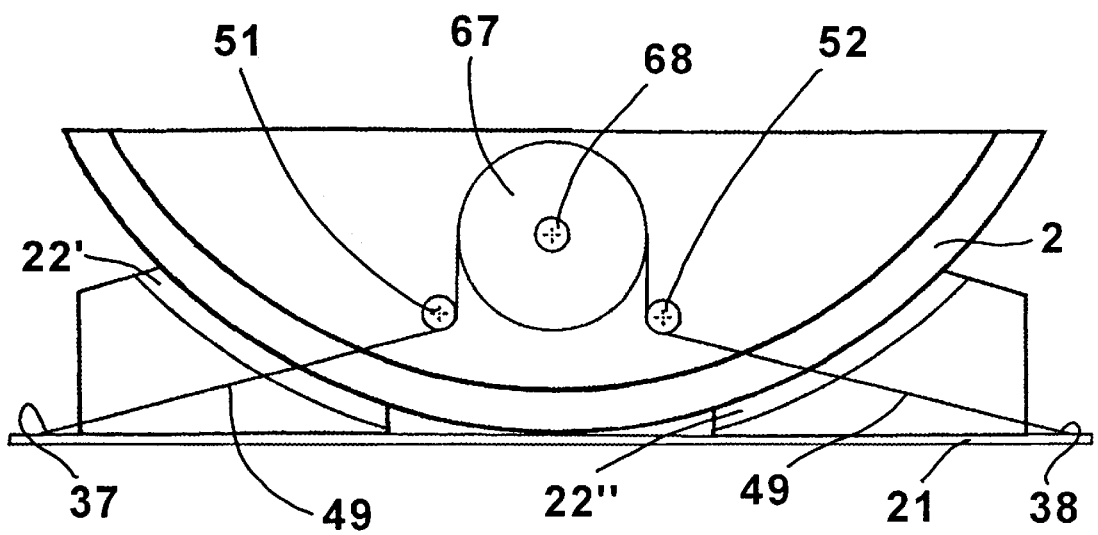

Further advantageous features of the invention are disclosed in the appended claims and in the following detailed description of the invention by reference to several preferred but not limiting embodiments. The attached rough drawing illustrate said embodiments by showing in:

FIG. 1 The disposition of the seat levelling apparatus according to the invention when mounted in a motor vehicle cabin, in a side view with the vehicle side wall removed;

FIG. 2 the representation of FIG. 1, in a rear view with the vehicle cabin rear wall removed;

FIG. 3 a first embodiment of the seat levelling apparatus according to the invention, in a perspective front view, with roller chains and pulleys not shown;

FIG. 4 the base of the embodiment in FIG. 3, in the same view as in FIG. 3;

FIG. 5 the embodiment in FIG. 3, with the seat plate and part of the front wall removed, in the same view as in FIG. 3;

FIG. 6 the embodiment in FIG. 3, in a partial view with pulleys with roller chains mounted, in the same view as in FIG. 3;

FIG. 7 a motor driven drum co-operating with two non-segmented flexible actuation elements of a second embodiment of the invention; in a partial perspective view;

FIG. 8 a third embodiment of the invention with twin base bearing elements, in a transverse section;

FIG. 9 a fourth embodiment of the invention having only one flexible actuation element, in the same view as the embodiment in FIG. 8 but with some elements not shown.

A seat levelling apparatus 1 according to the invention basically comprises a seat mounting plate 3, a base plate 21, and a seat levelling assembly 4 sandwiched between the seat mounting plate 3 and the base plate 21. The disposition of the seat levelling apparatus 1 according to the invention mounted in the driver's or operator's cabin 5 of a motor vehicle is shown in FIGS. 1 and 2. The seat levelling apparatus 1 is under the driver's or operator's seat 6. Via base plate 21 the seat levelling apparatus 1 is fixed to the vehicle body section 7 designed for mounting the operator's or driver's seat. Seat 6 is mounted on top of seat mounting plate 3. Vehicle body section 7 can be integral with the cabin 5 floor. It is entirely within the scope of the invention to integrate seat mounting plate 3 with seat 6 and/or to integrate base plate 21 with vehicle body section 7. The seat levelling apparatus 1 can be mounted so as to provide for lateral tilting (as in FIGS. 1 and 2) or for forward/backward tilting. In operation seat mounting plate 3 is made to tilt in respect to base plate 21 to compensate for the tilting of the vehicle. This is exemplified in FIG. 2 by seat contour 6' indicating a compensation for 17° leftward tilting of the vehicle. As a rule compensation of lateral tilting is more important than compensation of forward/backward tilting. When mounted for compensation of lateral tilting, forward/backward tilting may be manually compensated, if required, by adaptation of the driver's or operator's seat. Today many types of standard seats for motor vehicles are provided with simple forward/backward tilting adjustment means by the manufacturer.

The first embodiment of the seat levelling apparatus 1 according to the invention shown in FIGS. 3–6 in addition to elements 3, 4, and 21 comprises tilting detection means 64 (for disposition, see FIG. 8) and electronic tilting compensation control means for controlling a reversible high gear electrical motor.

The seat levelling assembly 4 comprises an arcuate seat bearing element 2 (FIG. 5) and an arcuate base bearing element 22 (FIG. 4). The seat bearing element 2 has the approximate form of a cylinder mantle sectioned at a distance from and parallel with its axis. The seat mounting plate 3 is mounted on the sectioned faces of seat bearing element 2 by means of countersunk screws (not shown). The seat mounting plate is adapted to receive a seat of the kind used in off-road vehicles; only one through bore 14 for seat fixation (FIG. 3).

The arcuate base bearing element 22 (FIG. 4) is mounted by welding on base plate 21 which is adapted by, for instance, through bores 14' for being anchored (by, for instance, nuts and bolts) to a support section of a vehicle of which an operator's or driver's seat shall be provided with automatic levelling compensation. The base bearing element 22 has the approximate form of a cylinder mantle sectioned off and in parallel with its axis. At its corners base bearing element 22 has welded-on wedge-formed supports 23–26 giving it a table-like form. Supports 23–26 are fixed at base plate 21 by welding.

Arcuate seat bearing element 2 (FIG. 5) has about the same axial length as arcuate base bearing element 22 but spans over a considerably wider arc, typically an arc wider by about twice the maximum tilting (compensation) angle, that is, about 2×17°=34°. The radius of the inner cylindrical face of arcuate element 22 corresponds closely to the radius of the outer (convex) surface of arcuate element 2 which can be mounted in the former by superposition or sliding. By smoothening the co-operating faces of arcuate elements 2 and 22 and providing them with a lubricant arcuate element 2 can be made to glide in arcuate element 22 thereby turning around its axis. The axial movement of arcuate element 22 when mounted is limited by front and rear terminating members 27, 28 secured by screws 17 (indicated only) in treaded holes in supports 23, 24 and 25, 26, respectively. Seat bearing element 2 is provided with a front wall 18 and rear wall 19 against the facing faces of which arcuate element 2 abuts with its flat front 13 and rear end faces, respectively. Front 18 and rear 19 walls are of similar circle segment shape and have circumferential Z-formed flanges 9, 12 having radially extending terminal portions 10 and 11, respectively, in form of annular sections.

The movement of seat bearing element 2 in an axial direction (the terms 'radial' and 'axial' relate to the axis A (see FIG. 8) defining the mating cylinder section faces of elements 2 and 22) is restricted by the aforementioned arcuate terminating members 27 and 28. The radial movement of seat bearing element 2 is restricted by a front locking member (not shown) and a corresponding rear locking member 30 secured in terminating members 27 and 28, respectively, by screws 30 countersunk in the locking members. In the secured state seat bearing element 2 can rotate around its axis A and be slidingly removed from that disposition by excessive rotation in either direction; it can also be mounted in a corresponding reverse manner. Annular flange portions 11 and 10 run in grooves (front grove 39; rear grove not shown) formed by the front and rear faces of base bearing element 22 and central portions 36 of terminating members 27, 28 with reduced wall thickness; (FIG. 5).

The tilting compensation means is shown in FIG. 6. It comprises a reversible high gear electrical motor 40 secured by three screws 16 at a transverse intermediate wall 41 (see FIGS. 5 and 6) of seat bearing element 2. The motor shaft 42 extends parallel with the axis A of mating cylindrical faces of elements 2 and 22 (see FIG. 8). Two pulleys 43, 44 are fixed to shaft 42 at its front end. A first roller chain 45 is mounted in engagement with the first (foremost) pulley 43 in the following way: at its one, unloaded end roller chain 45 is fixed to an eye (not shown) mounted (at 15; FIG. 5) at the inner face of arcuate element 2 radially off pulley 43, extends from there to the (upper) side of pulley 43 facing away from arcuate element 2, then runs in engaging contact with pulley 43 over an angle of about 180° at the pulley's side facing away from the eye, returns in about the same direction from which it approached pulley 43, passes through a first circumferential slot 7 in arcuate element 2 and a first passage 31 in arcuate element 22, and is secured with its loaded end 47 (not shown) to an anchoring bolt 33 mounted in base plate 21. The unloaded end of roller chain 45 is fixed at the eye by interposition of a flat spiral spring (not shown) acting as a chain adjuster. Roller chain 46 is mounted in a mirroring relationship in respect of roller chain 45; here the anchoring bolt 34 for securing loaded end 48 is shown in FIG. 5.

A tilting detection means 64 of the type disclosed in the Norwegian patent specification no. 169 056 is fastened at the underside of seat mounting plate 3 (similar to its disposition in the embodiment shown in FIG. 8). Deviation of plate 3 from the horizontal level creates a negative or positive electric signal which is used to control the clockwise/anticlockwise rotation of shaft 42.

The second embodiment illustrated in FIG. 7 corresponds to the first embodiment disclosed in FIGS. 3–6 but for the flexible actuation elements and the pulleys. The second embodiment has only one driven roller or drum 58 fixed at the shaft 60 of an electric motor 59. On the cylinder surface of drum 58 steel wires 61 and 62 are wound in opposite directions about half a turn each. Their one ends are fixed to drum 58 by locking bolts 63 and 64, respectively. Their other ends (not shown) are fixed at the base plate in positions corresponding to those for the roller chains 45, 46 of the first embodiment to which they functionally correspond. Instead of steel wires 61, 62 also segmented flexible actuation elements, like roller chains, can be used. Drum 58 then would have to be substituted by pulleys.

The third embodiment shown in FIG. 8 is similar to the first embodiment but has twin arcuate base bearing elements defined, in principle, by twofold longitudinal sectioning of element 22 so as to obtain three sections of about equal width (about equal in section angle) of which the two outer ones 22'(left, in a front view) and 22"(right, in a front view) are conserved in their original position whereas the third is removed. This modification of the first embodiment according to the invention results in an important reduction in overall height. "A" denotes the axis defining the co-operating cylindrical surfaces of elements 2 and 22', 22", and the axis of rotation of element 2. The corresponding axes for the other embodiments have been omitted from their respective illustrations.

The fourth embodiment shown in FIG. 9 has the advantage of requiring only one flexible actuation element and one pulley but the drawback of greater overall height. The ends, both of which are loaded, of flexible actuation element 49 are fixed to anchoring bolts (at 37, 38) secured in base plate 21. From there element 49 extends towards a point about halfway between the pulley 68 fixed to the shaft 68 of a reversible motor (not shown) and the centre of base plate 21. When reaching the level of the lowest pulley circumference point element 49 is deflected perpendicularly away from plate 21 by means of passive deflection rolls 51, 52 to make a loop around and in engagement with pulley 67. On its way from rolls 51, 52 to the respective point of fixation 37, 38 the flexible segmented actuation element passes through passages and slots (not shown) in left and right segments 22', 22" corresponding in principle to the passages and slots of the arcuate base and seat elements of the other embodiments.

The flexible actuation elements of the invention can be tensioned on their loaded sides, for instance by interposing chain (or other) tensioning means between their loaded ends and base plate 21.

For damping reasons the flexible segmented actuation element of the invention can be made slightly resilient in its loaded portion extending between the base plate and the pulley. Synchronous toothed reinforced rubber belts have such properties but metal roller chains do not; their performance can be improved in this regard by interposition of a spring element between the bolt for fixation at the base plate and the flexible segmented actuation element.

An important improvement by the invention is the protection of the tilting compensation means within the compartment formed by the arcuate seat bearing element, the arcuate base bearing element, the seat mounting plate and crescent shaped front and rear walls. The only openings of the compartment are the passages (31, 32) for the flexible actuation element(s) which can be provided with, for instance, thin rubber sleeves for improved sealing against the intrusion of dirt. The electrical conductors for powering the motor, the inclination detector and the control circuit have not been shown in the drawings. They can be adduced through suitable openings in the seat mounting plate and/or the seat bearing plate.

A DC 24V motor with a speed/torque ratio of 3150 rpm at 10Ncm and a 1:400 gear is adequate in combination with a 50 mm ø pulley. A preferred control mode of the motor is pulsed. The control may be improved by data instructions for rate of response to tilting, acceleration of levelling movement, levelling movement threshold, etc., stored on a microchip forming part of the control circuit.

The maximum tilting angle α (FIG. 4) will be typically from 15° to 18°. A wider angle is not called for since compensation of a higher degree of tilting would make the operator think that the vehicle is in a stable condition while actually approaching the tipping angle which for most such vehicles is from about 25 to about 30° and more; an alarm can be coupled to and controlled by the circuit controlling the reversible motor so as to provide a warning signal upon the tilting exceeding a maximum allowed angle. The range of useful radius R of the cylinder mantle surface(s) is from about 7 to 25 cm; the optimum for most applications is a radius of about 10–15 cm.

FIG. 8 also illustrates the principles governing the (minimum) circumferential dimensions of the passages in the arcuate seat bearing element and the slots in the arcuate base bearing element. The transverse section through the embodiment shown in FIG. 8 is at the level of second pulley 44'. The tilting angle α is about ±170°. The passage aperture must be adapted allow for sectional displacement by ±17° off (in either direction) the extreme positions 46' and 46" of the loaded portions of the second roller chain, whereas the slot aperture must only be adapted to said extreme positions 46', 46". Fixation point 65 for the loaded end of chain 46 is not the optimal one in terms of minimising slot 8 length. The optimum location is at about point 66, slightly above base plate 21. In FIG. 8 two positions for pulley 44 other than the centred position are given: position 44' for compensation of maximum leftward tilting, and position 44" for compensation of maximum rightward tilting.

In the drawings and the description of the preferred embodiments like elements are often but not always identified by same reference numbers. Various combination of individual features of the invention are obvious to the person skilled in the art and are within the scope of the invention.

In the embodiments described above the reversible motor is disposed centrally and symmetrically in respect to the arcuate seat element. It can however also be disposed asymmetrically. Also within the scope of the present invention is to substitute the motor shaft by a shaft driven by a reversible motor via, for instance, gears.

A range of materials known to the person skilled in the art are appropriate for producing the various components of the seat levelling apparatus of the invention, such steel plate for the base plate and the seat mounting plate; light metal castings, for instance in aluminium, for the co-operating arcuate elements which, however, also can be made injection moulding of thermoplastic polymers; continuous casting in aluminium or light metal alloy for arcuate sections 22', 22". The detailed explanation of the invention was made by reference to preferred embodiments with cylindrical arcuate surfaces. With this explanation in mind the person skilled in the art will understand perfectly well how to design corresponding embodiments with one or several conical arcuate surfaces. Such surfaces will be best suited to their task by taking the form of an off-axis section of a frustrum of a cone. In a longitudinal disposition of an apparatus according to the invention (in relation to the vehicle in which it is mounted) the imaginary or real base of the frustrum would be preferably face rearwards for reasons of optimal accommodation under the seat. But also a zone surface of a sphere segment having one or two bases can be used, as can other rotationally (around axes corresponding to axis A in FIG. 8) defined surfaces.

The invention should not be considered limited to the combination of features in the above embodiments since other combinations of features of the invention will be plainly obvious to the person skilled in the art.

What is claimed is:

1. Self-levelling apparatus for a seat, comprising a base, a seat levelling assembly displaceably connected with the base, a drive means disposed between the seat and the base for rotation of the seat levelling assembly around an axis about parallel with the base, the seat levelling assembly being disposed between the base and said axis, the drive means comprising a reversible electrical motor fixed to the seat levelling assembly in a way as to have its shaft extending parallel with said axis, said shaft being in direct or indirect engagement with a flexible actuation means comprising a segmented actuation element means fixed at its one end at the base, and further comprising a detection means for detection of the position of the seat levelling assembly in respect to the horizontal plane, the detection means being coupled to control means for control of the motor.

2. The apparatus of claim 1, wherein the displaceable connection of the seat levelling assembly with the base is by means of co-operating seat and base bearing elements pertaining to the seat levelling assembly and the base, respectively, of which elements at least one comprises a surface defined by rotation of a straight, curved or irregular line around said axis.

3. The apparatus according to claim 2, wherein the cylinder segment or cone segment shaped surface of the seat or base bearing element is designed for co-operation with glide, rolling or ball means comprised by the base or seat bearing element, respectively.

4. The apparatus of claim 3, wherein the concave cylinder segment or cone segment shaped surface of the base bearing element is interrupted at the level of the base plate, thereby forming two concave cylinder segment or cone segment shaped surfaces defined by one cylinder or cone axis and radius. radius.

5. The apparatus of claim 1, wherein the segmented actuation element is selected from synchronous (toothed) belts, roller chains and bead-profiled wires.

6. The apparatus of claim 1, wherein the engagement by the shaft is via a drum, tooth gear or pulley fixed to the shaft.

7. The apparatus of claim 1, comprising a second segmented actuation element.

8. The apparatus of claim 7, wherein the segmented flexible actuation elements pass through openings in the seat and base bearing elements.

9. The apparatus of claim 8, wherein the opening in the seat bearing element is slot-formed, is transposable in respect of the opening in the base bearing element in an overlapping relationship.

10. The apparatus of claim 9, wherein the area of the opening in the seat bearing element is less than 30% of the slot area, preferably less than 20%.

11. The apparatus according to claim 1, integrated in the seat and/or the vehicle body.

12. Self-levelling apparatus for a seat, comprising:
- a base including a cylinder segment wall shaped base bearing element having a concave cylinder segment shaped gliding surface defined by an axis,
- a seat levelling assembly displaceably connected with the base, including a cylinder mantle segment shaped seat bearing element having a convex cylinder segment shaped surface defined by said axis in abutting contact with said concave gliding surface,
- a drive means, comprising a reversible electrical motor mounted at the seat levelling assembly with its shaft extending parallel with said axis, said shaft being in direct or indirect engagement with two flexible segmented actuation elements fixed at their respective one end at the base, and further comprising
- a detection means for detection of the position of the seat levelling assembly in respect to the horizontal plane, the detection means being coupled to control means for control of the motor.

13. Self-levelling apparatus for a seat, comprising a detection means for detection of the position of the seat in respect to the horizontal plane, an element having about the form of a cylinder segment sectioned at a distance from and parallel with its axis and forming a compartment, an electric motor controlled by control means coupled to said detection means and mounted in said compartment and having a shaft extending parallel with said axis, the shaft being provided with one or several pulleys, drums or gears, said cylinder segment-formed element being mounted in a trough-formed element supported on a base and having a concave cylindrical surface defined by said axis, said elements being displaceable by rotation relative to each other around said axis over an angle of up to 180° and having pairs of passages opening at their respective cylinder surface and being in superposed relationship during said rotation, and further comprising one or several flexible actuation elements selected from roller chains, toothed belts and beaded wires, said flexible actuation elements being in engagement with one or several of said pulleys, drums or gears and extending through one of said superimposed passages and being fixed to the base.

* * * * *